(12) United States Patent
Chang (10) Patent No.: US 7,969,655 B2
(45) Date of Patent: Jun. 28, 2011

(54) PRISM SHEET

(75) Inventor: Shao-Han Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 345 days.

(21) Appl. No.: 12/195,444

(22) Filed: Aug. 21, 2008

(65) Prior Publication Data

US 2009/0244738 A1 Oct. 1, 2009

(30) Foreign Application Priority Data

Apr. 1, 2008 (CN) .......................... 2008 1 0300812

(51) Int. Cl.
*G02B 5/02* (2006.01)
*G02B 13/20* (2006.01)

(52) U.S. Cl. ........... 359/599; 362/620; 349/64; 349/112

(58) Field of Classification Search .................. 359/599; 362/620; 349/64, 112
See application file for complete search history.

(56) References Cited

U.S. PATENT DOCUMENTS

2009/0021667 A1* 1/2009 Horiguchi et al. .............. 349/64
2009/0080218 A1* 3/2009 Hsu et al. ...................... 362/620

* cited by examiner

*Primary Examiner* — Alessandro Amari
(74) *Attorney, Agent, or Firm* — Steven M. Reiss (57) ABSTRACT

An exemplary prism sheet includes a transparent main body. The transparent main body includes a first surface and a second surface. The first surface and the second surface are on opposite sides of the main body. The first surface of transparent main body defines a plurality of spherical depressions. The second surface defines a plurality of rectangular structures. Each rectangular structure defines four adjacent triangular pyramid depressions.

16 Claims, 9 Drawing Sheets

PRISM SHEET

CROSS-REFERENCE TO RELATED APPLICATION

This application is related to a co-pending U.S. patent application, Ser. No. 12/186,529, filed on Aug. 6, 2008, and entitled "PRISM SHEET". The inventor of the co-pending application is Shao-Han Chang. The co-pending application has the same assignee as the present application. The Specification and Drawings of the co-pending application is incorporated herein by reference.

BACKGROUND OF THE INVENTION

1. Field of the Invention

The present invention relates to a prism sheet, particularly to a prism sheet employed in a backlight module.

2. Description of the Related Art

Figure 8:
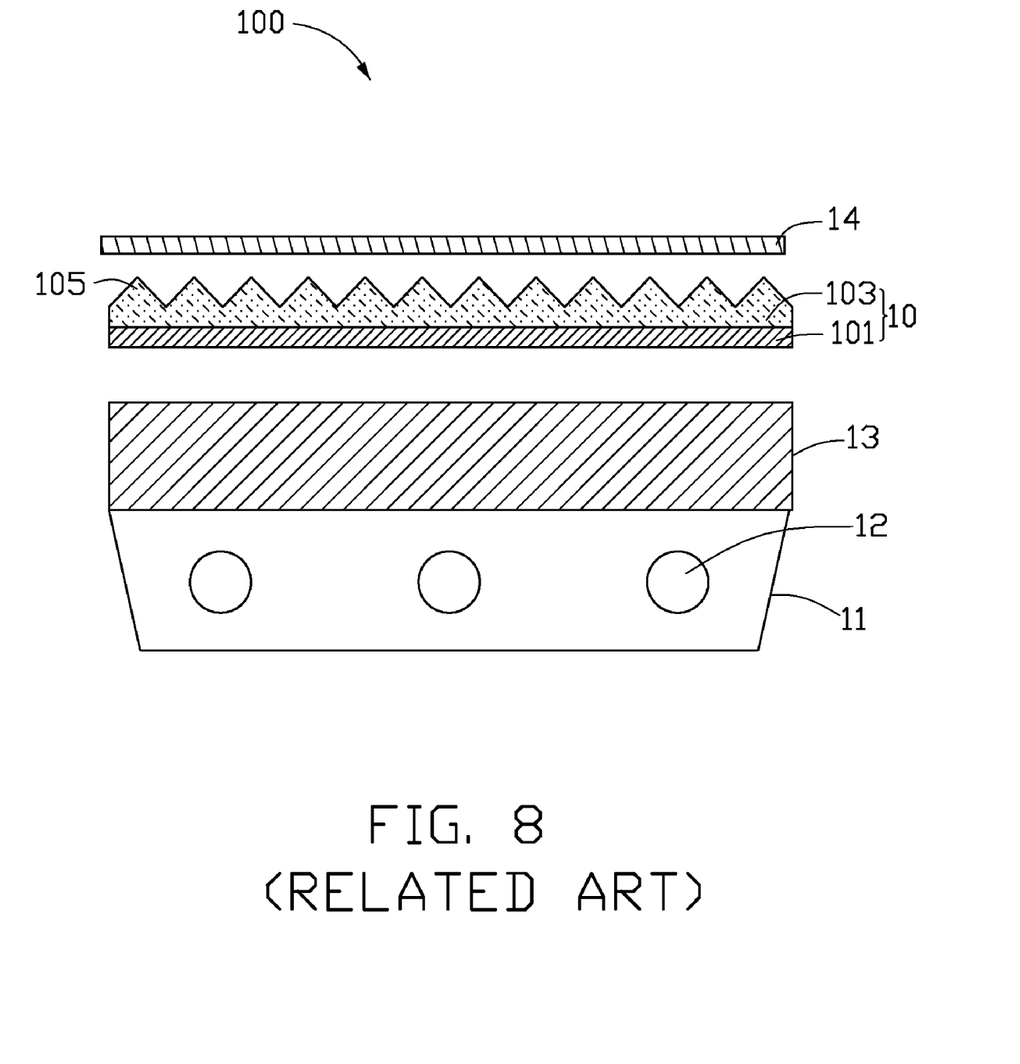
FIG. 8 is a side cross-sectional view of a conventional backlight module.
Figure 9:
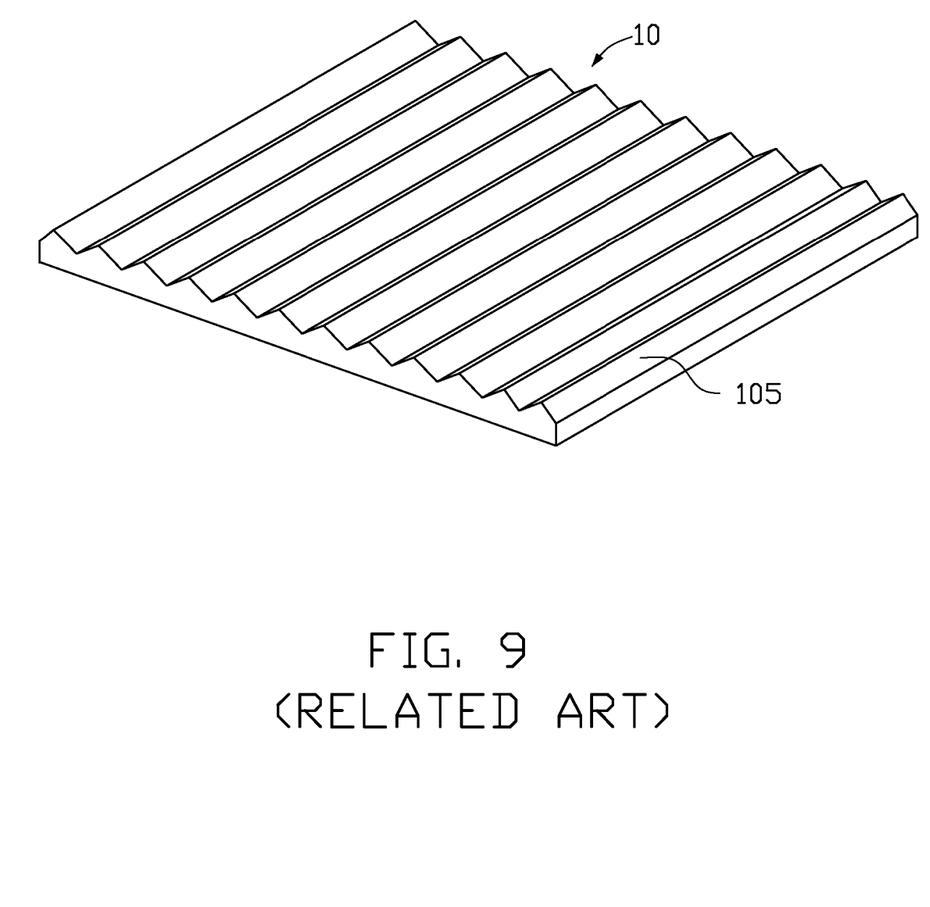
FIG. 9 is an isometric view of the prism sheet in FIG. 8.

Referring to FIGS. 8 and 9, a typical direct type backlight module 100 includes a frame 11, a plurality of light sources 12, a light diffusion plate 13, and a prism sheet 10. The light sources 12 are disposed in an inner side of the frame 11. The light diffusion plate 13 and the prism sheet 10 are disposed on the light sources 12 above a top of the frame 11 in that order. The light diffusion plate 13 includes a plurality of diffusing particles (not shown) configured for diffusing light. The prism sheet 10 includes a transparent substrate 101 and a prism layer 103 formed on a surface of the transparent substrate 101. The prism layer 103 forms a plurality of elongated V-shaped ridges 105.

In use, light from the light sources 12 enters the diffusion plate 13 and becomes scattered. The scattered light leaves the diffusion plate 13 to the prism sheet 10. The scattered light then travels through the prism sheet 10 and is refracted out at the elongated V-shaped ridges 105 of the prism sheet 10. The refracted light leaving the prism sheet 10 is concentrated at the prism layer 103 and increases the brightness (illumination) of the prism sheet 10. The refracted light then propagates into a liquid crystal display panel (not shown) disposed above the prism sheet 10.

However, although light from the light sources 12 enters the diffusion plate 13 and becomes scattered, after the light leaves the prism sheet 10, strong light spot of the light sources 12 is often formed.

In order to reduce or eliminate the strong light spot of the light sources 12, the backlight module 100 should further include an upper light diffusion film 14 disposed on the prism sheet 10. However, although the upper light diffusion film 14 and the prism sheet 10 are in contact with each other, a plurality of air pockets may still exist around the boundaries of the light diffusion film 14 and the prism sheet 10. When the backlight module 100 is in use, light passes through the air pockets, and some of the light undergoes total reflection by the air pockets along one or another of the corresponding boundaries. In addition, the upper light diffusion film 14 may absorb a certain amount of the light from the prism sheet 10. As a result, a brightness of light illumination of the backlight module 100 is reduced.

Therefore, a new prism sheet is desired in order to overcome the above-described shortcomings.

SUMMARY

A prism sheet includes a transparent main body. The transparent main body includes a first surface and a second surface. The first surface and the second surface are on opposite sides of the main body. The first surface of transparent main body defines a plurality of spherical depressions. The second surface defines a plurality of rectangular structures and each rectangular structure defines four adjacent triangular pyramid depressions.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe embodiments of the present prism sheet in detail.

Figure 1:
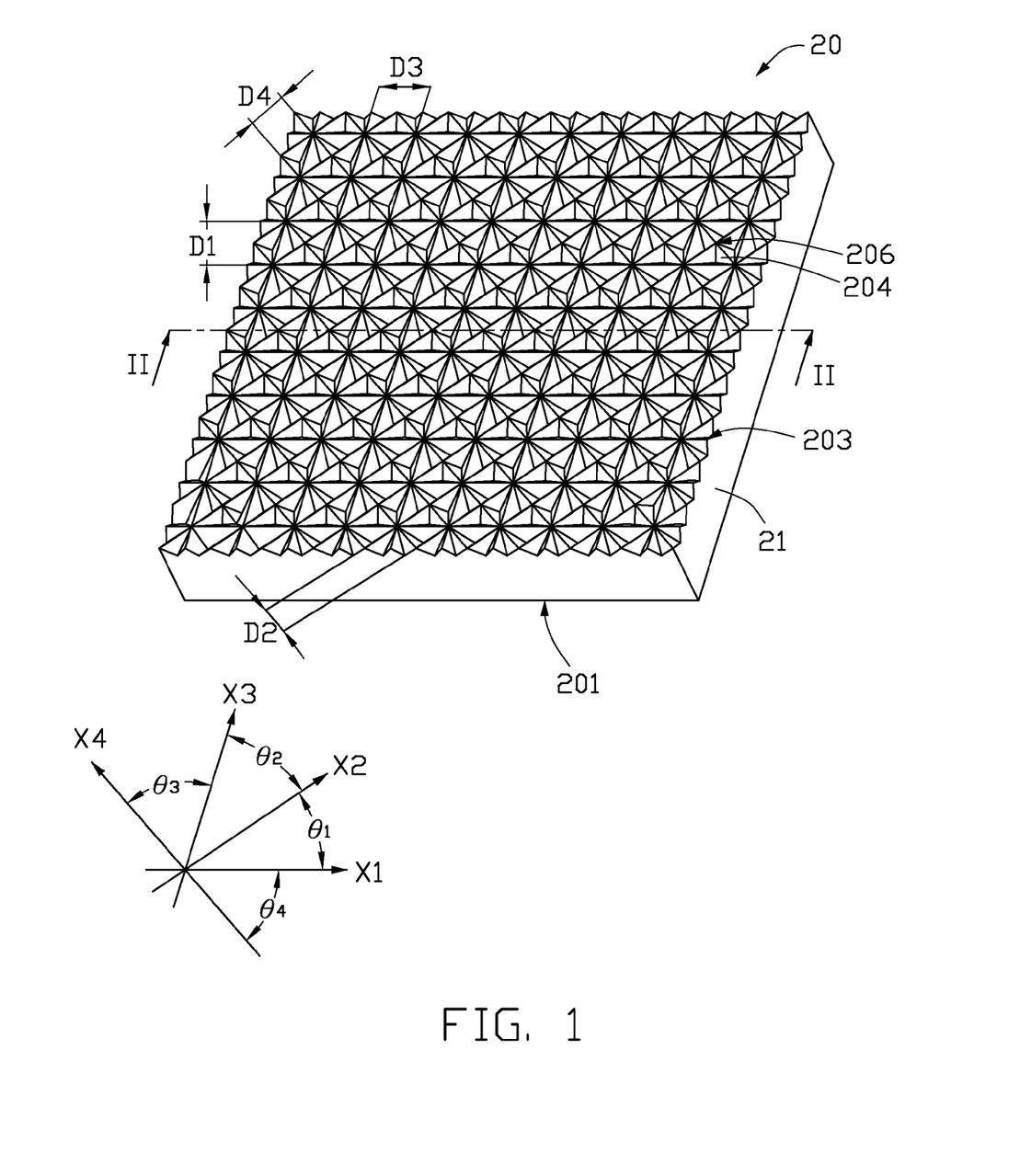
FIG. 1 is an isometric view of a prism sheet in accordance with a first embodiment of the present invention.
Figure 2:
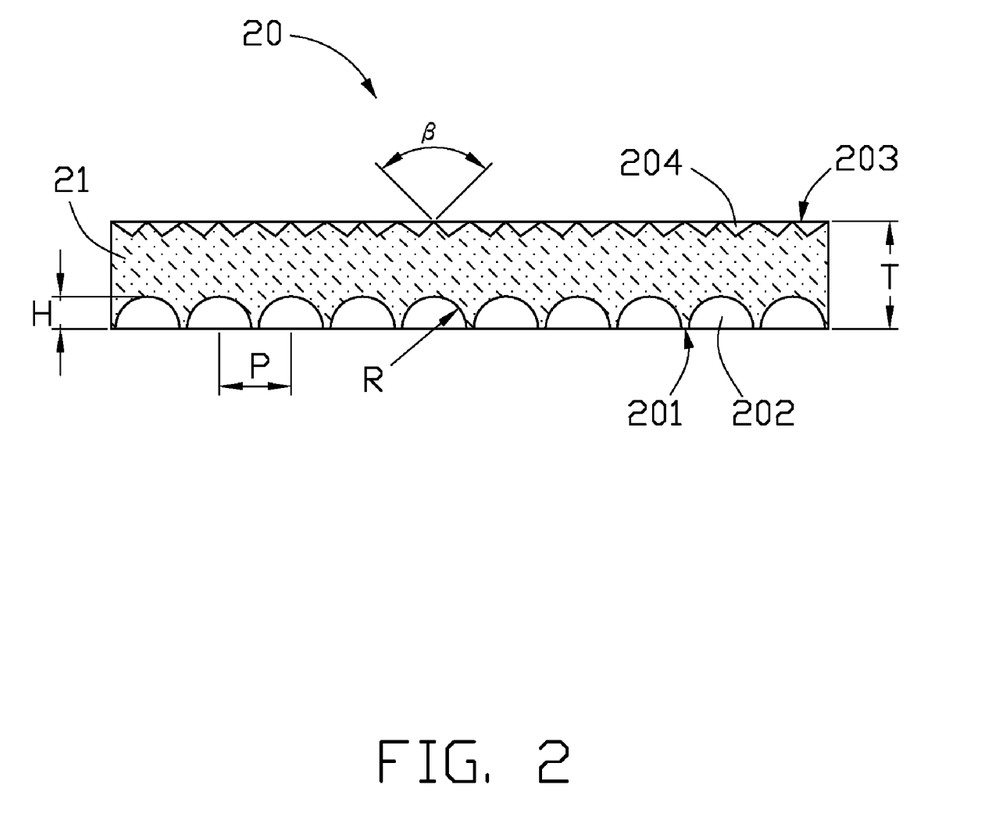
FIG. 2 is a side cross-sectional view taken along the line II-II of FIG. 1.
Figure 3:
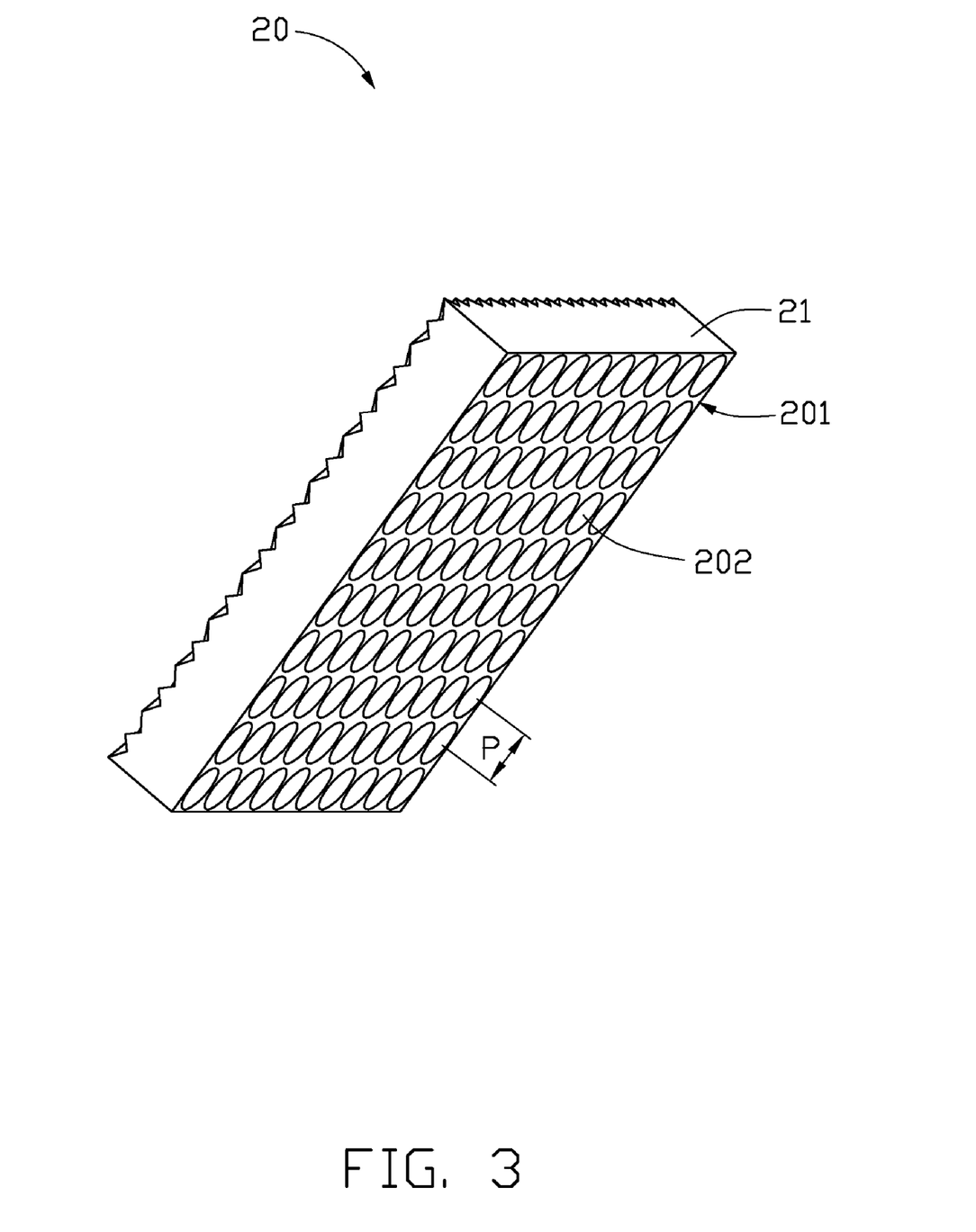
FIG. 3 is similar to FIG. 1, but shows a view of the prism sheet from another aspect.

Referring to FIGS. 1 through 3, in a first embodiment, a prism sheet 20 includes a main body 21. The main body 21 includes a first surface 201 and a second surface 203. The first surface 201 and the second surface 203 are on opposite sides of the main body 21. The first surface 201 defines a plurality of spherical depressions 202. The second surface 203 defines a plurality of rectangular structures 206 and each rectangular structure 206 defines four adjacent triangular pyramid depressions 204. Each side of the rectangular structure 206 is bordered with a side of another adjacent rectangular structure 206.

The substantially semi-spherical depressions 202 are distributed in a matrix manner in the first surface 201, thereby forming a plurality of rows and columns. The radius R defined by each spherical depression 202 is preferably in the range from about 0.01 millimeters to about 3 millimeters. In a column, a pitch P of adjacent spherical depressions 202 is in the range from about 0.025 millimeters to about 1.5 millimeters. In a row, the spherical depressions 202 are connected to each other. The depth H of each spherical depression 202 is in the range from about 0.01 millimeters to about 3 millimeters.

The triangular pyramid depressions 204 are closely connected. In each rectangular structure 206, the four triangular pyramid depressions 204 together with the sidewalls thereof cooperatively form a four-pointed star. The four-pointed stars are distributed in a matrix manner in the second surface 203.

In the illustrated embodiment, corresponding sidewalls on each side of adjacent depressions 204 sharing a same edge collectively form V-shaped ridges, namely, a plurality of first V-shaped ridges, a plurality of second V-shaped ridge, a plurality of third V-shaped ridges, and a plurality of fourth V-shaped ridge. The first V-shaped ridges extend along a first direction X1. The second V-shaped ridges extend along a second direction X2. The third V-shaped ridges extend along a third direction X3. The fourth V-shaped ridges extend along a fourth direction X4.

The first, second, third, and fourth V-shaped ridges intersect with each other and cooperatively define the triangular pyramid depressions 204. In addition, the first V-shaped ridges and the third V-shaped ridges intersect with each other and form a plurality of intersections. Each of the plurality of intersections also intersects the second V-shaped ridges and the fourth V-shaped ridges correspondingly.

The first direction X1 and the second direction X2 cooperatively define an angle $\theta_1$, the second direction X2 and the third direction X3 define an angle $\theta_2$, the third direction X3 and the fourth direction X4 define an angle $\theta_3$, and the first direction X1 and the fourth direction X4 define an angle $\theta_4$. The $\theta_1$, $\theta_2$, $\theta_3$, $\theta_4$ are 45 degree angles.

A vertex angle β of the V-shaped ridge is in the range from about 80 degrees to about 100 degrees. A pitch of the first V-shaped ridge is in the range from about 0.025 millimeters to about 1 millimeter. In the illustrated embodiment, the relations of the first, the second, the third, and the fourth V-shaped ridges are determined by the formula: $D1=D3=\sqrt{2}D2=\sqrt{2}D4$, wherein D1 represents a pitch of the first V-shaped ridges, D2 represents a pitch of the second V-shaped ridges, D3 represents a pitch of the third V-shaped ridges, and D4 represents a pitch of the fourth V-shaped ridges.

A thickness T of the sheet 20 is in the range from about 0.4 millimeters to about 4 millimeters. The prism sheet 20 can be made of a material selected from the group consisting of polycarbonate, polymethyl methacrylate, polystyrene, copolymer of methyl methacrylate and styrene, and any suitable combination of those. A mold used to manufacture the prism sheet 20 includes a plurality of spherical protrusions formed on a first side surface and a plurality of triangular pyramid protrusions formed on a second side surface opposite to the first side surface. The spherical protrusions are configured to form the spherical depressions 202 on the first surface 201 of the prism sheet 20 and the triangular pyramid protrusions are configured to form the triangular pyramid depressions 204 on the second surface 203 of the prism sheet 20, such that both sides of the prism sheet can be produced at a same time per injection molding.

The prism sheet 20 can be employed in a backlight module (not shown) in such manner that the first surface 201 is facing the light source of the backlight module and the second surface 203 is farther away from the light sources. Light enters the prism sheet 20 via the first surface 201. Since the inner surfaces of the spherical depressions 202 are curved and the inner surfaces of the triangular pyramid depressions 204 are slanted, incident light that may have been internally reflected on a flat surface, are refracted, reflected, and diffracted. As a result, light outputted from the second surface 203 is more uniform than light outputted from a light output surface of a conventional prism sheet. Strong light spot of the light sources seldom occurs. There is no need to add an extra upper light diffusion film between the prism sheet 20 and the liquid crystal display panel. Thus, the efficiency of light utilization is enhanced.

Referring to the Sheet 1 below, test samples are provided.

| Sheet 1 | |
|---|---|
| Test samples | Condition |
| 1 | LED+ prism sheet 10 |
| 2 | LED+ prism sheet 20 |

Figure 4:
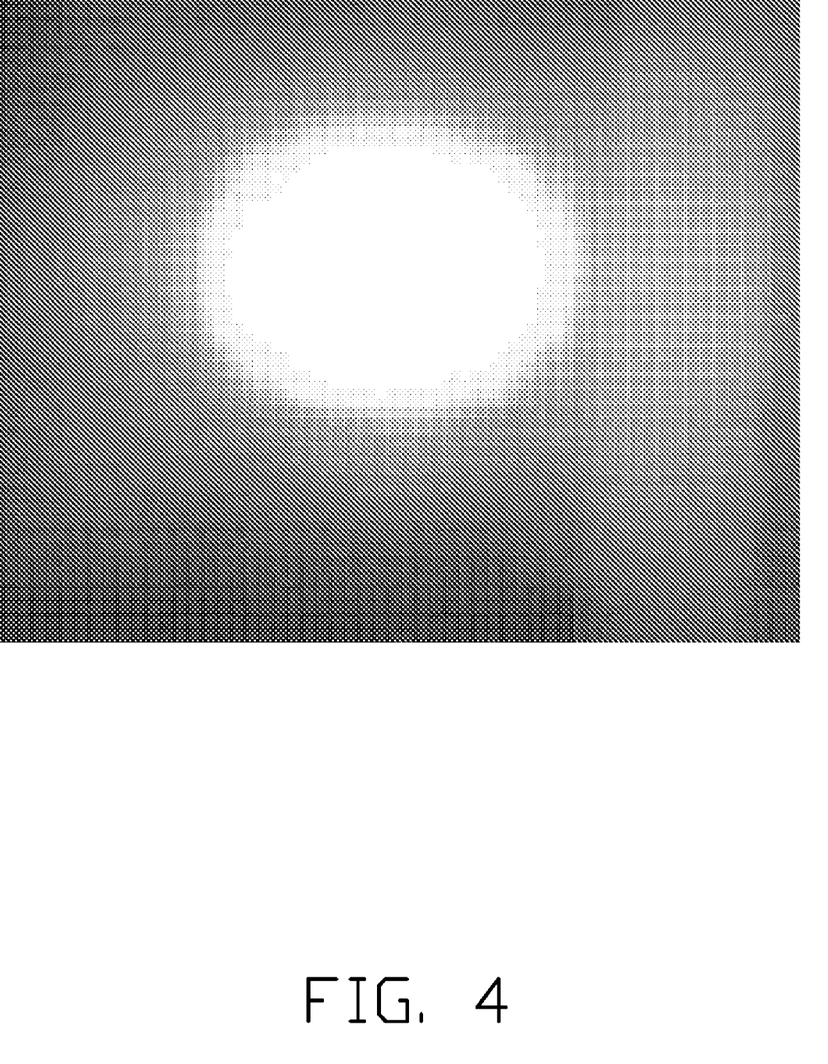
FIG. 4 is a photo showing an illumination distribution test result of the prism sheet of FIG. 9.
Figure 5:
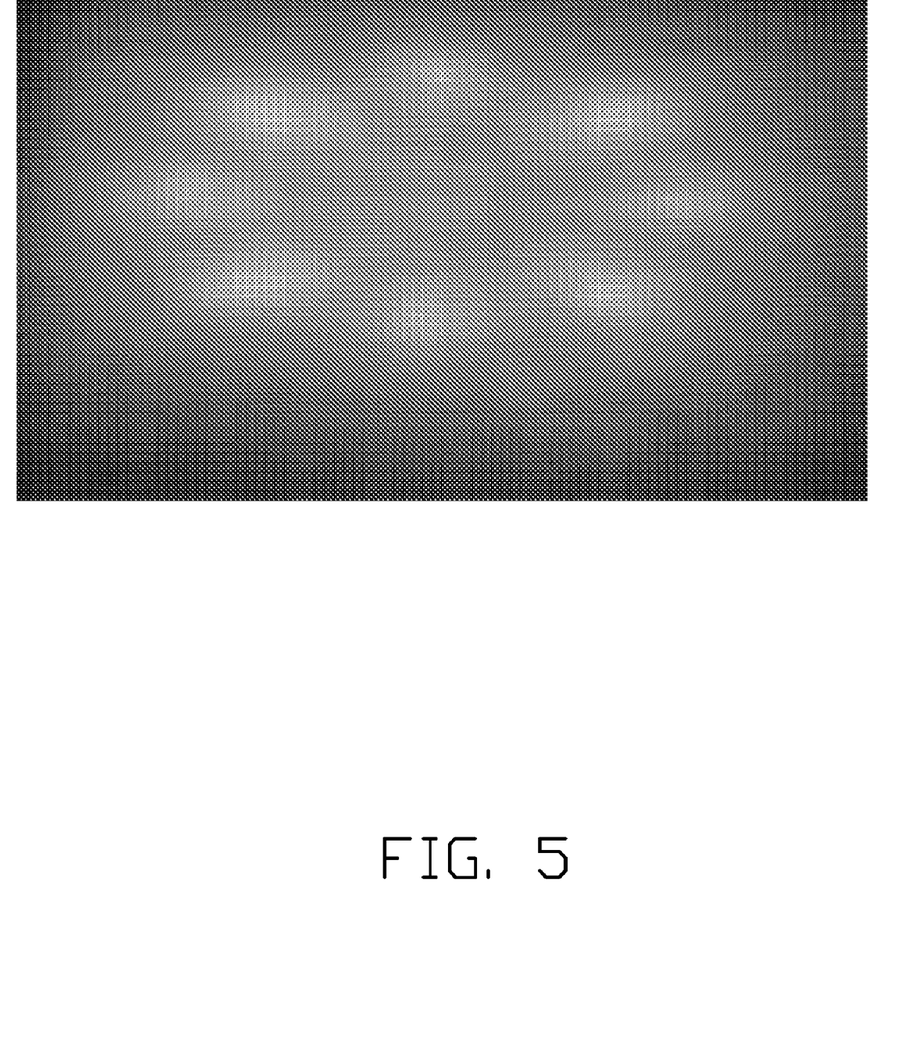
FIG. 5 is a photo showing an illumination distribution test result of the prism sheet of FIG. 1.

Referring to the FIGS. 4 and 5, which reflect the test results from the test conditions in Sheet 1, light emitting from the prism sheet 10 will form a relatively strong light spot as shown in FIG. 4; in contrast light emitting from the prism sheet 20 will form a plurality of relatively weak light spot as shown in FIG. 5. The test results show light emitting from the prism sheet 20 has more uniform. Therefore, when the prism sheet 20 is employed in a backlight module, strong light spot of the light sources seldom occurs, more uniform light is achieved, there is no need to add an upper light diffusion film between the prism sheet 20 and the liquid crystal display panel 25. Thus, the efficiency of light utilization is enhanced.

In addition, because the triangular pyramid depressions 204 form the first, the second, the third, and the fourth V-shaped ridges, light emitting from the second surface 203 would be concentrated in planes perpendicular to the first direction X1, the second direction X2, the third direction X3, and the fourth direction X4 respectively, thereby increasing the brightness (illumination) of the prism sheet 10 along a direction perpendicular to the second surface 203.

In addition, in contrast to the conventional prism sheet 10, the prism sheet 20 is integrally formed by injection molding technology. The prism sheet 20 has a better rigidity and mechanical strength than the conventional prism sheet because the prism sheet is formed as a whole unit integrally. Thus the prism sheet 20 has a relatively high reliability.

Figure 6:
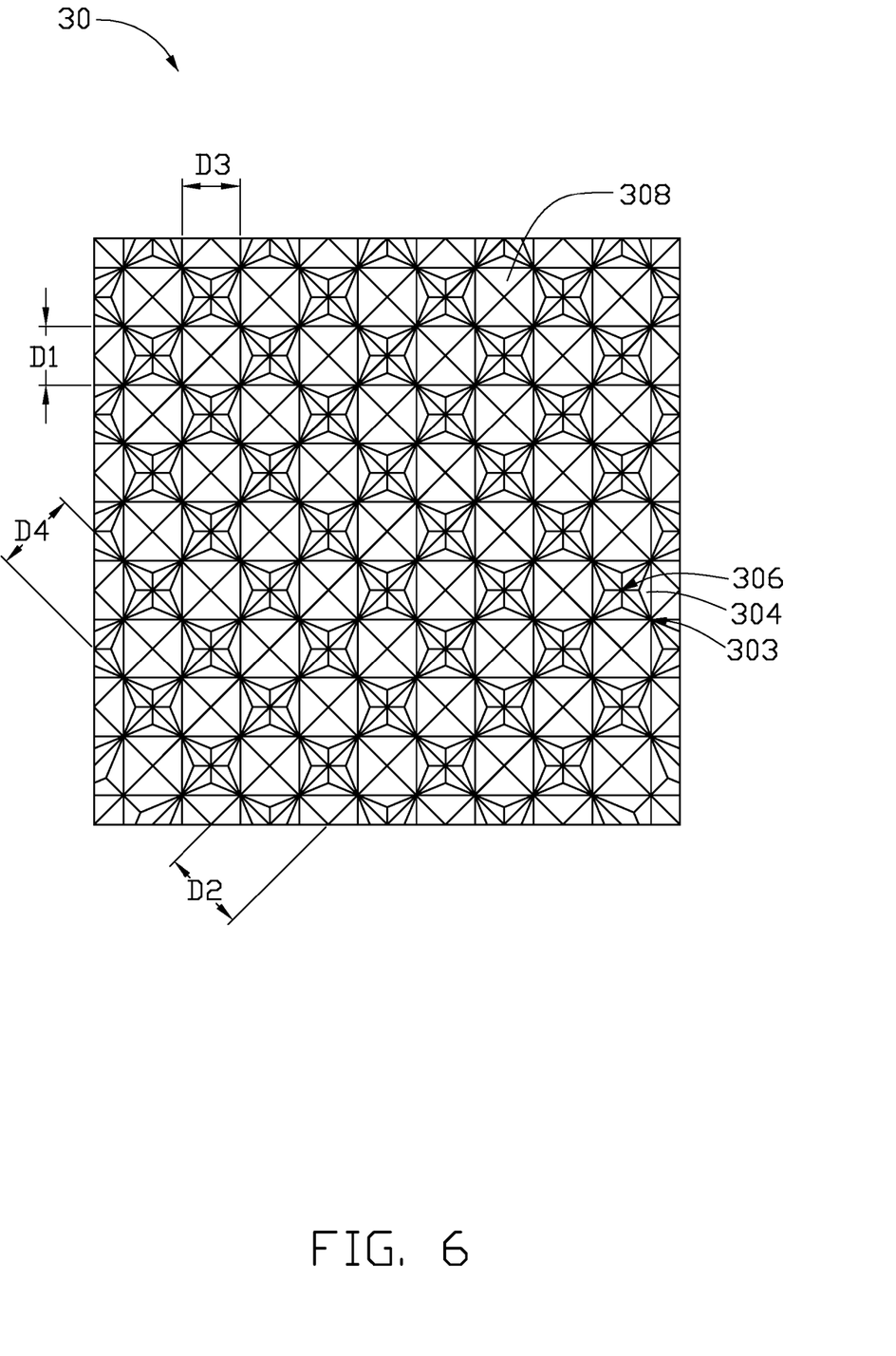
FIG. 6 is a top plan view of a prism sheet in accordance with a second embodiment of the present invention.

Referring to FIG. 6, a prism sheet 30 in accordance with a second preferred embodiment is shown. The prism sheet 30 is similar in principle to the prism sheet 20 of the first embodiment, the second surface 303 defines a plurality of rectangular structures 306 and each rectangular structure 306 defines four adjacent triangular pyramid depressions 304. The prism sheet 30 also defines a plurality of quadrilateral pyramids 308. Each side of the rectangular structures 306 is bordered with one side of one quadrilateral pyramid 308.

Figure 7:
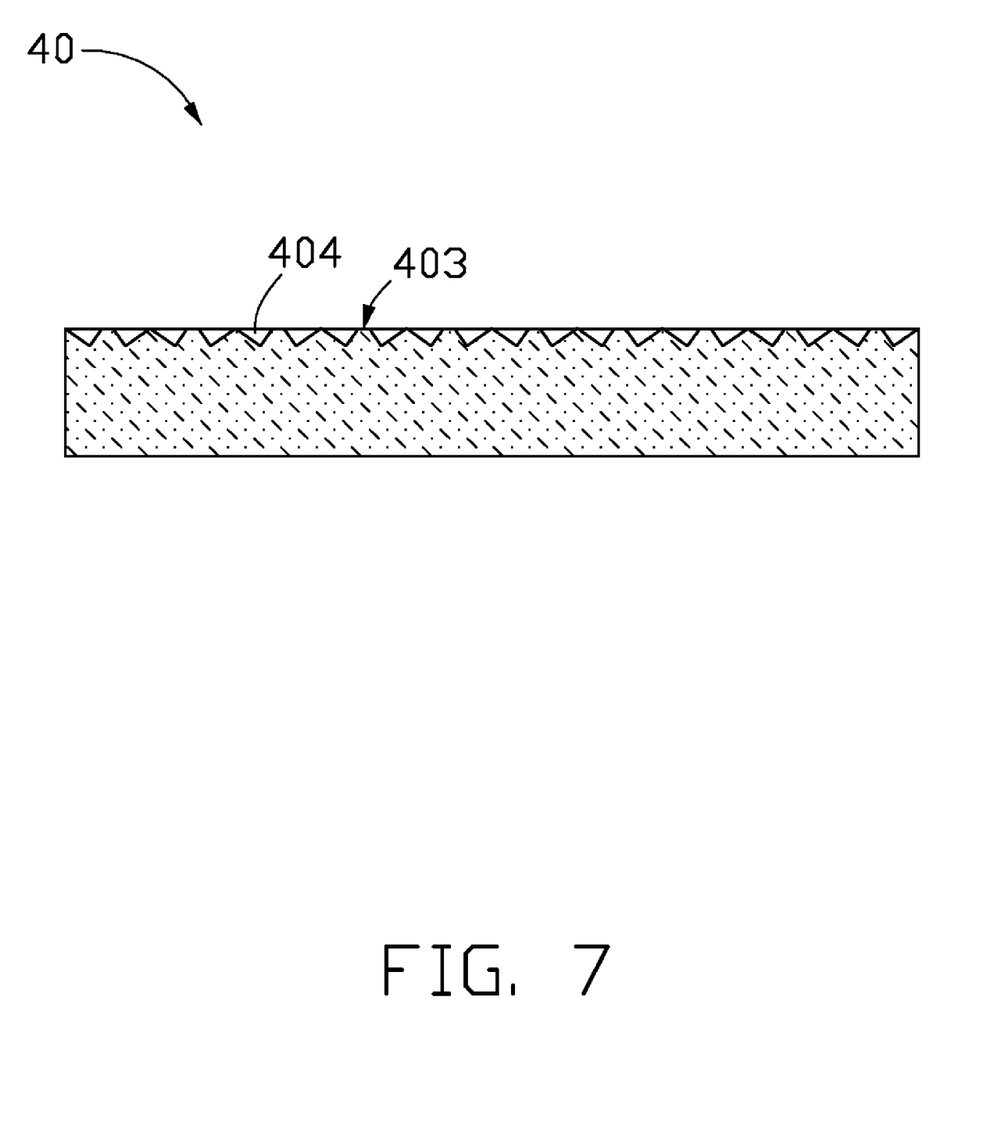
FIG. 7 is a side cross-sectional view of a prism sheet in accordance with a third embodiment of the present invention.

Referring to FIG. 7, a prism sheet 40 in accordance with a third preferred embodiment is shown. The prism sheet 40 is similar in principle to the prism sheet 20 of the first embodiment, a plurality of the triangular pyramid depressions 404 are defined in the second surface 403. However a top end of the V-shaped ridge is flat. Since the top end of the V-shaped ridges is flat, strength of the V-shaped ridges is enhanced. As a result, the prism sheet 40 has a higher reliability than a prism sheet with the V-shaped ridges, the top of which would be easily damaged in use.

The shape of the spherical depressions can also be elliptical. The spherical depressions can also be distributed on the second surface randomly.

Finally, while the preferred embodiment has been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet comprising:
   a transparent main body comprising:
   a first surface defining a plurality of spherical depressions; and
   a second surface being on the opposite side of the main body from the first surface, the second surface defining a plurality of rectangular structures, each rectangular structure defining four adjacent triangular pyramid depressions;
   wherein, the four triangular pyramid depressions of each rectangular structure are closely connected and together with sidewalls thereof cooperatively form a four-pointed star, each four-pointed star comprises eight triangular side surfaces; the four-pointed stars are distributed in a matrix manner in the second surface.

2. The prism sheet as claimed in claim 1, wherein each of the plurality of the rectangular structures borders with four other of the plurality of the rectangular structures, and sidewalls on each side of adjacent depressions sharing a same edge collectively form a plurality of first V-shaped ridges extending along a first direction, a plurality of second V-shaped ridge extending along a second direction, a plurality of third V-shaped ridges extending along a third direction, and a plurality of fourth V-shaped ridge extending along a fourth direction, the first V-shaped ridges and the third V-shaped ridges intersect with each other and form a plurality of intersections, each of the plurality of intersections also intersect the second V-shaped ridges and the fourth V-shaped ridges correspondingly.

3. The prism sheet as claimed in claim 2, wherein an angle defined by the first direction and the second direction, an angle defined by the second direction and the third direction, an angle defined by the third direction and the fourth direction, and an angle defined by the fourth direction and the first direction are 45 degrees.

4. The prism sheet as claimed in claim 2, wherein a vertex angle of each of the V-shaped ridges is in the range from about 80 degrees to about 100 degrees.

5. The prism sheet as claimed in claim 2, wherein at least one portion of the top end of the V-shaped ridge is flat.

6. The prism sheet as claimed in claim 1, wherein the thickness of the prism sheet is in the range from about 0.4 millimeters to about 4 millimeters.

7. The prism sheet as claimed in claim 1, wherein a radius of each spherical depression is in the range from about 0.01 millimeters to about 3 millimeters.

8. The prism sheet as claimed in claim 1, wherein a pitch of adjacent spherical depressions is in the range from about 0.025 millimeters to about 1.5 millimeters.

9. The prism sheet as claimed in claim 8, wherein a depth of each spherical depression is in the range from about 0.01 millimeters to about 3 millimeters.

10. The prism sheet as claimed in claim 1, wherein a material of the prism sheet is selected from the group consisting of polycarbonate, polymethyl methacrylate, polystyrene, copolymer of methylmethacrylate and styrene, and combination thereof.

11. The prism sheet as claimed in claim 1, wherein the second surface further defines a plurality of quadrilateral pyramids, and each side of each of the plurality of rectangular structures borders with one side of one of the quadrilateral pyramids.

12. The prism sheet as claimed in claim 11, wherein the thickness of the prism sheet is in the range from about 0.4 millimeters to about 4 millimeters.

13. The prism sheet as claimed in claim 11, wherein a radius of each spherical depression is in the range from about 0.01 millimeters to about 3 millimeters.

14. The prism sheet as claimed in claim 11, wherein a pitch of adjacent spherical depressions is in the range from about 0.025 millimeters to about 1.5millimeters.

15. The prism sheet as claimed in claim 14, wherein a depth of each spherical depression is in the range from about 0.01 millimeters to about 3 millimeters.

16. The prism sheet as claimed in claim 11, wherein a material of the prism sheet is selected from the group consisting of polycarbonate, polymethyl methacrylate, polystyrene, copolymer of methylmethacrylate and styrene, and combination thereof.

* * * * *